June 30, 1964  W. PAULE ETAL  3,139,555
LIGHT CONTROL ARRANGEMENT FOR VEHICLES
Filed Feb. 16, 1961  3 Sheets-Sheet 1
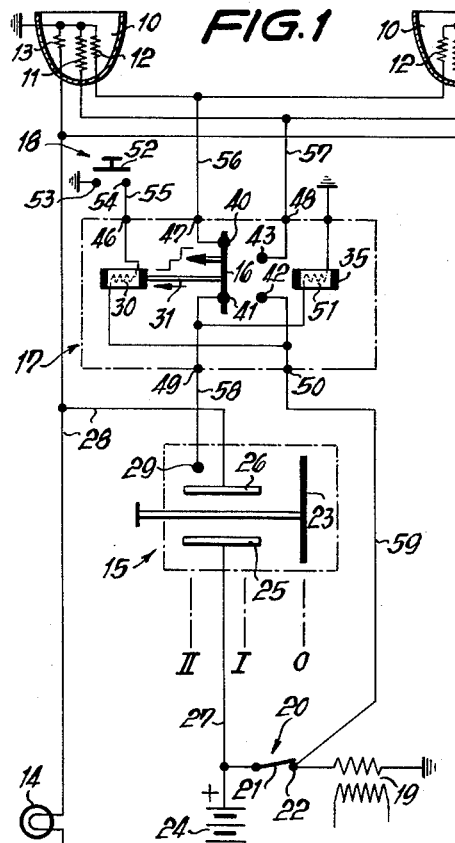
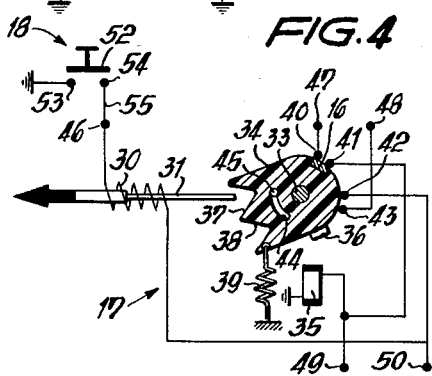
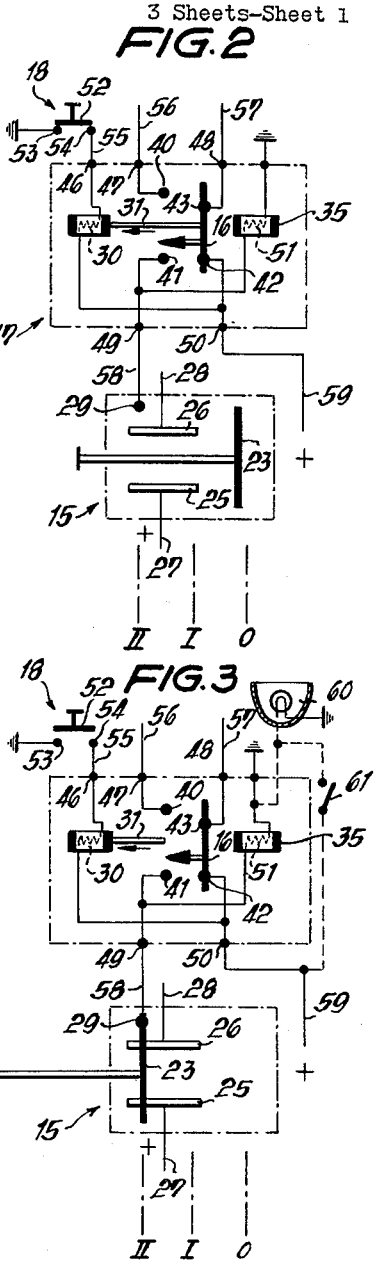
INVENTORS
Wilhelm Paule
Albert Lichtenberger
by
Michael S. Striker
Attorney

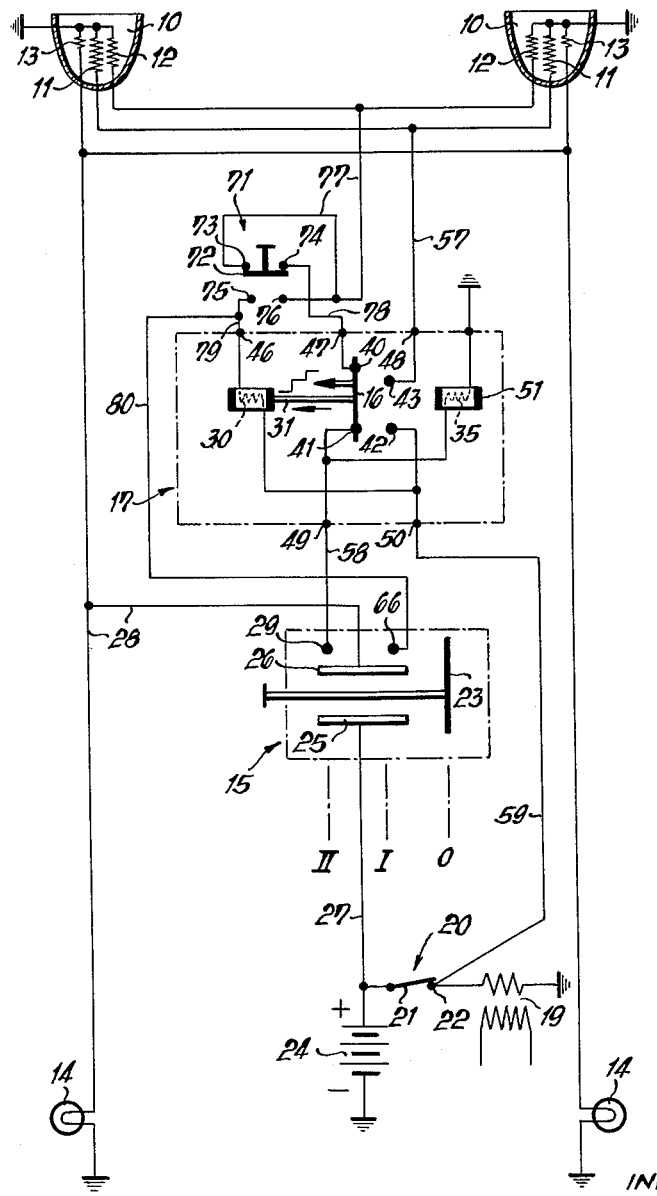

United States Patent Office 3,139,555
Patented June 30, 1964

3,139,555
LIGHT CONTROL ARRANGEMENT
FOR VEHICLES
Wilhelm Paule, Stuttgart-Oberturkheim, and Albert Lichtenberger, Stuttgart, Germany, assignors to Robert Bosch GmbH, Stuttgart, Germany
Filed Feb. 16, 1961, Ser. No. 89,717
Claims priority, application Germany Feb. 19, 1960
4 Claims. (Cl. 315—82)

The present invention concerns a light control and relay apparatus for vehicles, especially motor vehicles, equipped with headlights having parking light, high beam and low beam filaments.

Vehicles of such type are usually provided with a main light switch movable between three positions, one in which all the lights are switched off, a second one in which the parking light filaments only are switched on, and a third one which is used during driving for having either the high beam or the low beam filaments, or both of them, energized. In addition, there is provided usually a separate light switch, usually a push button switch, preferably operable by foot action, for switching over from high beam operation to low beam operation, and vice versa. Moreover, there is usually provided an ignition switch which is operated for the purpose of starting and stopping the operation of the vehicle or of its engine.

The conventional equipment as described above entails the following operation: The first mentioned main light switch can be operated at any time for changing between: no lights on; parking lights on; depending upon the actual position of the second, push button switch, high beam or low beam on. Consequently, the second, push button switch is only effective when the main light switch is in its third position. However, it is often desirable to give light signals to on-coming vehicles by blinking the headlights, i.e. either changing between low beam and high beam operation alternatingly, or by repeatedly switching on and off the high beam filaments of the headlights. Such signalling is not possible with the conventional equipment if the main light switch is in its first or second position, i.e. if no lights or only parking lights are switched on. It is, therefore, a main object of the invention to provide for a light control apparatus which would permit giving light signals of the type mentioned above irrespective of the actual position of the main light switch.

It is another object of this invention to provide for a light control apparatus in which a single light control switch, separate from the conventional three-position main light switch, serves to give light signals by means of the high beam filaments of the headlights even when the main light switch is in its "off" or "parking light" position, and also for switching between high beam and low beam operation when the main light switch is in its third position.

Still another object of this invention is to provide an apparatus of the type set forth in which an electromagnetic relay is located within the light installation of the vehicle and is operable by a single light control switch, as mentioned above, for carrying out the just described switching and signaling operation.

Finally, a further object of this invention is to provide an electromagnetic relay of such characteristics as to be usable for the above purposes.

With above objects in view, a light control arrangement for vehicles having at least one headlight with at least a high beam filament and a low beam filament, and a source of electric energy for energizing the same, comprises, according to the invention, in combination, a high beam electrical connection between the source of energy and the high beam filament; a low beam electrical connection between the source of energy and the low beam filament; a main light switch arranged in said low beam electrical connection and movable between circuit-opening and circuit-closing positions; combined switch means arranged in said low beam electrical connection and in said high beam electrical connection and movable between a first, low beam connecting position closing said low beam electrical connection but interrupting said high beam electrical connection, and a second, high beam connecting position closing said high beam electrical connection but interrupting said low beam electrical connection; biasing means permanently tending to move said combined secondary switch means from said second, high beam connecting position into said first, low beam connecting position; holding means holding said combined secondary switch means in said second, high beam connecting position against the action of said biasing means, when said main light switch is in circuit-closing position; and actuating means for moving said combined secondary switch means from said first, low beam connecting position into said second, high beam connecting position against the action of said biasing means, and from said second, high beam connecting position into said first, low beam connecting position against the holding action of said holding means.

In another aspect of this invention, a light control arrangement for vehicles having headlights with parking light, high beam and low beam filaments, and a source of electric energy for energizing the same, comprises, in combination, a main light switch having a first set of contact means for controlling parking light filaments and a second set of contact means for controlling the high and low beam filaments, and being movable between a first position in which none of said contact means is operative, a second position in which said first set of contact means is operative, and a third position in which said second set of contact means is operative; light control switch means movable between a normal "off," and "on" position; relay means actuatable by said source upon movement of said light control switch means to "on" position and having two sets of contacts, said relay means being changeable between a first and second position for rendering in its first position said first set of contacts thereof operative, and for rendering in its second position said second set of contacts thereof operative, said first set of contacts being assigned to control the low beam filaments, and said second set of contacts being assigned to control the high beam filaments, said relay means including biasing means for urging said relay means into its first position, first electromagnet means for changing, upon one energization thereof, said relay means from its first position to its second position against the action of said biasing means, and second electromagnet means for holding, when energized, said relay means in its second position against the action of said biasing means, said first electromagnet means being capable of changing, upon a second energization following said one energization thereof, said relay means from its second position to its first position against the holding action of said second electromagnet means; first circuit means connecting said source with one side of said first and second sets of contact means of said main light switch, and connecting the other side of said first set of contact means with the parking light filaments; second circuit means connecting the other side of said second set of contact means of said main light switch with one side of said first set of contacts of said relay means and with said second electromagnet means for energizing the latter when said main light switch is moved to its third position; third circuit means connecting said source with one side of said second set of contacts of said relay means, and with said first electromagnet means in series with said light control switch means for energizing said first electromagnet means upon moving said light control switch means to "on" position; and fourth circuit means connecting the other side of said first and second sets of contacts of said relay means with the low beam and high beam filaments, respectively, whereby, when said main light switch is in its first or second position, blinking signals can be given with the high beam filaments by repeated operation of said light control switch means, and when said main light switch is in its third position, the headlights can be switched from low to high beam by one operation of said light control switch means, and back from high to low beam by a following second operation thereof.

In still another aspect of this invention, a relay apparatus comprises, in combination, first electromagnet means adapted to be energized from an outside source of electric energy; movable contact means movable by said first electromagnet means upon one energization thereof from a first position to a second position, and upon a consecutive second energization, from said second position to said first position; biasing means for urging said movable contact means toward said first position thereof; second electromagnet means adapted to be energized by said outside source of electric energy for holding, when energized, said movable contact means in said second position thereof against the action of said biasing means, but incapable of holding said movable contact means in said second position against action of said first electromagnet means; first counter-contact means cooperating with said movable contact means for closing when the latter is in said first position thereof, a first circuit connectable to said first counter-contact means; and second counter-contact means cooperating with said movable contact means for closing, when the latter is in said second position thereof, a second circuit connectable to said second counter-contact means, so that when none of the first and second electromagnet means is energized, said movable contact means is in its first position for closing said first circuit, and when said first and second electromagnet means are energized simultaneously a first time, said movable contact means is moved to its second position and held therein for keeping said second circuit closed until by a subsequent second energization of said first electromagnet means said movable contact means is returned to its first position, and when only said first one of said electromagnet means is energized said movable contact means is moved to its second position for closing said first circuit, but returns under action of said biasing means to its first position when energization of said first electromagnet means is discontinued.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a schematic circuit diagram illustrating one embodiment of the invention;

FIG. 2 illustrates in the same manner a portion of the diagram of FIG. 1, with one of the component parts in a position different from that shown in FIG. 1;

FIG. 3 is an illustration similar to FIG. 2, showing another component of the arrangement in a position different from those shown in FIGS. 1 and 2;

FIG. 4 is a diagrammatic illustration of a relay apparatus forming part of the arrangement illustrated by FIGS. 1–3;

FIG. 6 is a schematic circuit diagram illustrating a further modification of the arrangement illustrated by FIG. 5.

Figure 5:
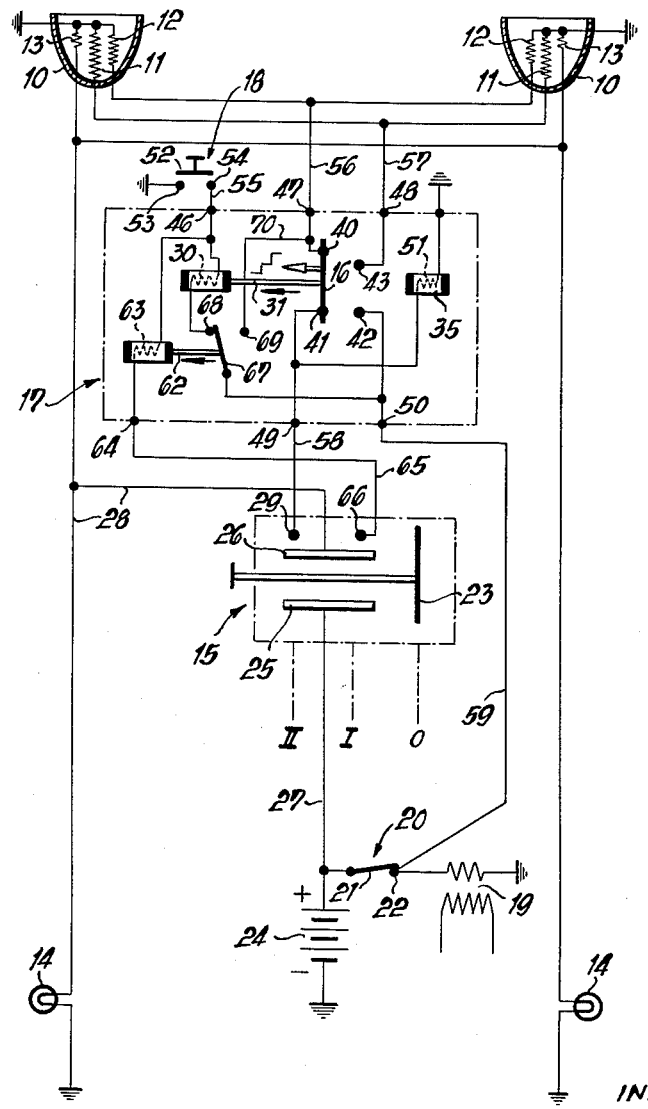
FIG. 5 is a schematic circuit diagram illustrating a modification of the arrangement according to FIGS. 1–4.

Referring now to FIGS. 1–4, it is to be assumed that a motor vehicle is equipped with two headlights 10, each having a high beam filament 11, a low beam filament 12 and a parking light filament 13. Of course, the individual filaments need not be arranged within one single light bulb. Also, a bulb containing the parking light filament 13 may be arranged outside the actual headlight 10. Tail lights 14 are connected in parallel with the parking light filaments 13. The electrical installation further comprises as a source of electric energy a battery 24 and an ignition coil 19 which is energizable in well known manner by an ignition switch 20 having a member 21 movable into engagement with a stationary contact 22 as shown.

The operation of the above mentioned filaments 11, 12 and 13 is controllable, in the first place, by a main light switch 15 of generally known type, in connection with secondary light control switch means represented in this embodiment by a relay apparatus shown within the dotted line frame 17 and operable by a light control switch 18 which may be a pushbutton switch, as illustrated, operable manually or by any other means.

The main light switch 15 is provided with a movable bridging contact member 23 and movable between a first position, marked O, which is the "lights off" position, a second position marked I, which is the "parking lights on" position, and a third position marked II, which is the "headlights on" position. In the second position marked I, the member 23 connects a set of stationary contact members 25 and 26 of which contact 25 is connected by the line 27 with a positive terminal of the battery 24, while the other contact 26 is connected by a line 28 having corresponding branches with the parking light filaments 13 and with the tail lights 14. In the third position, marked II, of the member 23 the contact 25 is connected with a third contact 29 and may be simultaneously also connected to the above mentioned contact 26. The contact 29 serves to control the headlight filaments 11 and 12 in the manner described further below, depending upon the operation of the relay 17 upon actuation of the light control switch 18.

The secondary switch means being, in this embodiment a relay apparatus, the actuating means for carrying out the desired light control comprise an electromagnet 30 connected, as shown, between the contact 22 and the switch 18 for being energized from the battery 24 when the ignition switch 20 is in closed position and when, under these conditions, the member 52 of switch 18 is moved into contact with the counter-contacts 53, 54. As can be seen in greater detail from FIG. 4, the electromagnet 30 has a movable armature 31 biased by means not shown in the direction of the arrow toward a normal or idle position as shown. Upon energization of the electromagnet 30 the armature member 31 is moved in a direction opposite to the biasing arrow so as to move a bridging contact member 16 from its normal position shown in FIGS. 1 and 4 to a second position shown in FIGS. 2 and 3. In the embodiment illustrated by FIG. 4 the bridging member 16 is carried by a rotatable member 34 made of insulating material and supported on a shaft 33. The rotary movement of the member 34 is limited by a stationary pin 45 cooperating with a corresponding arcuate slot 44. Biasing means e.g. a spring 39 urges the member 34 into its normal position as shown in FIGS. 1 and 4. The member 34 is further provided with two indentations 37 and 38 cooperating with the outer end of the armature member 31 which is preferably flexible. Thus, when upon energization of electromagnet 30 the armature 31 is moved in direction toward the member 34 the latter will be turned in clockwise direction as seen in FIG. 4, by the engagement of the end of armature 31 with the recess 37. Thus the member 34 is caused to assume its second position defined by the end of slot 44 abutting against the pin 45. When electromagnet 30 is deenergized and armature 31 withdrawn by its biasing means, the member 34 returns to its first position as shown under the action of spring 39. However if the second electromagnet 35 having a coil 51 was energized before or simultaneously with the energization of electromagnet 30 the member 34 will be held in the above described second position by the action of the electromagnet 35 on a soft iron member 36 mounted in suitable position on member 34 as long as the electromagnet 35 remains energized even when the electromagnet 30 is again deenergized. However, if under the last mentioned conditions the electromagnet 30 is energized a second time the armature 31 will move forward to engage the second indentation or recess 38 and force the member 34 back into its first position against the holding action of the electromagnetic arrangement 35, 36, being assisted herein by the spring 39.

In the first position of the relay 17 or, in other words, in the first position of the member 34, the bridging contact member 16 interconnects two stationary contacts 40 and 41 as shown in FIGS. 1 and 4. However, in the above mentioned second position of the relay or of the member 34, the bridging contact member 16 interconnects two other stationary contacts 42 and 43 as shown in FIGS. 2 and 3. The electromagnetic relay 17 as illustrated in FIGS. 1 to 4 constitutes in itself a structural unit or component and may be contained in a housing carrying five terminals 46, 47, 48, 49 and 50. The coil of the electromagnet 30 is connected between the terminals 46 and 50, the latter being also connected to the stationary contact 42. Contact 40 is connected to terminal 47 and contact 43 is connected to terminal 48. The coil 51 of the second electromagnet 35 is connected between ground and terminal 49, the latter being also connected with the contact 41.

The contact 53 of switch 18 is connected to ground while the other contact 54 of switch 18 is connected to terminal 46. As usual, the negative terminal of the battery 24 is grounded as are also the free ends of the filaments 11, 12, 13 and those of tail lights 14.

From terminal 47 a branched line 56 leads to the low beam filaments 12, and a similarly branched line 57 leads from terminal 48 to the high beam filaments 11 of the head-lights 10. The terminal 49 is connected by line 58 with the stationary contact 29 of the main light switch 15, and the terminal 50 is connected by line 59 with the contact 22 of the ignition switch 20, as mentioned above.

The operation of the above arrangement illustrated by FIGS. 1–4 is as follows: When ignition switch 20 is closed and the main light switch 15 is in its "off" position marked O, which corresponds to conditions as ordinary daytime driving, actuation of the light control switch 18 will result in the flow of a current from the positive terminal of the battery 24 through line 59, terminal 50, electromagnet 30, terminal 46, line 55, contact 54, switch member 52 and contact 53 to ground. Consequently, the relay or rather the electromagnet 30 is energized and moves in the manner described above the bridge contact 16 from its first position into its second position as shown in FIG. 2, in which member 16 interconnects the contacts 43 and 42. Consequently current now flows also through the bypass line 59, terminal 50, contact 42, bridge 16, contact 43, terminal 48 and line 57 to the high beam filaments 11 of the headlights 10 and from there to ground. Thus the high beam filaments are energized. The moment the switch 18 is released or returned to open position, the electromagnet 30 of the relay 17 is deenergized and the armature 31 returns to idle position, thus permitting the member 34 to return under the action of spring 39 to its first position whereby the circuit for the high beam filaments 11 is interrupted. Thus it can be seen that repeated actuation of the push button switch 18 results in corresponding blinking signals by means of the high beam filaments 11, the rhythm of the signals being entirely at the discretion of the operator.

It can be seen that the same performance could be carried out also when the engine is not in operation if line 59 were not connected to contact 22 but directly with the positive terminal of the battery 24.

Assuming now that the main light switch 15 is changed to its second position, marked I, the entire operation and function of the arrangement remains the same. The only difference is the fact that now also a circuit for the parking light filaments 13 and taillights 14 is closed so that current can flow from the positive terminal of the battery 24 through line 27, contact 25, movable contact member 23, contact 26 and line 28 to the filaments 13 and the tail lights 14.

It will be understood that with this arrangement it is possible to give blinking signals with the high beam filaments of the headlights anytime even when the main light switch 15 is in its first or second position.

Assuming now that the vehicle is in operation with the ignition switch 20 closed and with the main light switch 15 in its third position, marked II, and the switch 18 being in normal open position, then current would flow from the positive terminal of battery 24 through line 27, contact 25, bridge contact 23, contact 29, line 58, contact 41, bridge contact 16, contact 40, line 56 to the low beam filaments 12. In addition, if contact 26 extends far enough for being engaged by member 23 when the latter engages contact 29, also the parking light filaments 13 and tail lights 14 are energized through line 28. If energization of the parking light filament 13 under the circumstances is not desired, a minor modification of the circuit diagram would result in a corresponding change. It is of importance that under the above assumption and condition the low beam filaments 12 are energized and that, as can be seen from the diagram, at the same time the coil 51 of the second electromagnet 35 is also energized.

If now the switch 18 is operated, first the electromagnet 30 is energized as described above whereby the member 16 is moved to its second position in which it interconnects the contacts 42 and 43, while at the same time disconnecting the contacts 40 and 41 from each other. Consequently the light from the low beam filaments 12 is extinguished while the high beam filaments 11 are switched on. Upon release of the switch 18 the electromagnet 30 is deenergized, the armature 31 moves back to idle position, but the bridge contact member 16 is held in its position as shown by FIG. 3 by the action of the holding magnet 53 cooperating with the member 36, against the action of the spring 39. Thus the high beam filaments 11 will remain energized until the switch 18 is operated a second time whereby, as described above, the bridging contact member 16 is forced back to its first position, against the holding action of the electromagnet 35. In this return movement the spring 39 is a contributory factor. As soon as the member 16 is turned to its first position, the light from the high beam filaments 11 is extinguished and the low beam filaments 12 are again energized.

Consequently, whenever the main light switch 15 is in its third position marked II repeated operation of the control switch 18 will result in a switch from high beam to low beam or back from low beam to high beam. Of course, the next following actuation of switch 18 would result to another change from high beam to low beam.

It can be seen from the above and from FIG. 1, that with the arrangement as illustrated, movement of the main light switch 15 into its third position marked II while switch 18 is in open position, the low beam filaments 12 will be switched on and not the high beam filaments 11. Moreover, due to the connection of the bypass line 59 to contact 22, the high beam filaments 11 can be energized for continuous operation or for giving blinking signals only when the ignition switch 20 is in closed position.

In some motor vehicles a separate fog light 60 is provided as shown in FIG. 3 in which case the fog light 60 would have to be connected between ground and one end of the winding 51 of the second holding electromagnet 35, this cricuit replacing, of course, the ordinary ground connection of the winding 51. The auxiliary circuit for the fog light 60 is shown in dotted lines and comprises a bypass containing a separate fog light switch 61 for connecting, whenever desired the fog light 60 directly to the positive terminal of battery 24. Consequently, even if the main light switch 15 is moved to its third position marked II, the winding 51 of the second electromagnet 35 would be shunted upon closing of the fog light switch 61 because in this case both terminals of the winding 51 would be connected to the same terminal of the battery 24. Consequently, the member 34 with its contact bridge member 16 would automatically return to its first position under the action of the spring 39 so that the bridge 16 would again interconnect the contacts 40 and 41.

Under certain circumstances it may be desirable to provide for an operation of the arrangement by which, when the main light switch 15 is in its second position marked I, blinking signals can be given only with the low beam filaments 12. Such circumstances may exist in localities where the use of the high beam at night is prohibited. FIG. 5 illustrates a modification of the arrangement according to FIGS. 1 to 4 capable of meeting the just described conditions. The operation of this arrangement, when the main light switch 15 is in its first position marked O or in its third position marked II is exactly the same as in the above described case. However, the arrangement according to FIG. 5 differs from the first described one by the addition of a further electromagnetic relay having a winding 63 connected between the terminal 46 and an additional terminal 64, and adapted to operate an armature 62 for controlling a switch member 67. The terminal 64 is connected by a line 65 with an additional stationary contact 66 in the main light switch 15, the contact 66 being so arranged that upon movement of the member 23 into the second position marked I, contact 66 is connected with the contact 25 and thereby also with the positive terminal of battery 24. In the normal position of the switch member 67 the latter connects terminal 50 with terminal 68 connected to one side of the electromagnet 30, while upon energization of electromagnet 63 the contact member 67 is moved into engagement with terminal 69 which is connected with terminal 47.

If now, while the main light switch 15 is in its second position marked I and the ignition switch 20 is closed, the switch 18 is moved to closed position current will flow from the positive terminal of the battery 24 through line 27, contacts 25, member 23, contact 26 through line 28 to the parking light filament 13 and the tail lights 14, however also from member 23 through contact 66, line 65, terminals 64, electromagnet 63, terminal 46, and the closed switch 18 to ground. At the same time current flows from the closed ignition switch 20, line 59, terminal 50, member 67, contact 68, electromagnet 30, terminal 46 and through the closed contact 18 also be ground. Actually energy is applied both to the electromagnets 30 and 63. However the dimensions of these electromagnets can be so chosen in relation to each other than under these circumstances only the electromagnet 63 is energized so as to move the movable contact 67 into its second position so as to engage contact 69 whereby the low beam filaments 12 are directly connected to the positive terminal of battery 24 as can be seen from FIG. 5, while the circuit of the electromagnet 30 is interrupted. Consequently, by repeated or intermittent actuation of the switch 18 blinking signals can be given by intermittent energization of the low beam filaments 12.

It should be noted that in both embodiments according to FIGS. 1–4 and according to FIG. 5 only one wire connection 55 is required for connecting the not-grounded contact 54 of the switch 18 with the relay apparatus 17. This is in certain cases very advantageous, particularly if the switch 18 is to be constructed as a push button switch for manual operation and for being mounted on the steering wheel or on the steering wheel column.

FIG. 6 illustrates a further modification of the embodiment illustrated by FIG. 5. In this case the main light switch 15 contains also the additional contact 66 as described above, while the relay apparatus 17 is left exactly as has been shown and described with respect to FIGS. 1–4. However, the normally open make-switch 18 is replaced by a change-over switch 71 having a normal "off" position in which a movable contact member 72 connects two stationary contacts 73 and 74, while in the "on" position the member 72 interconnects the stationary contacts 75 and 76. The contacts 73 and 76 are connected with each other by a line 77 which is also connected with the low beam filament 12 of the headlights 10. From the contact 74 a line 78 leads to the terminal 47, and from the contact 75 a line 79 leads to the terminal 46, the latter being connected by a bypass line 80 with the above mentioned additional contact 66 of the main light switch 15.

If now the main light switch 15 is moved to its second position marked I the parking light filaments 13 and the tail lights 14 are energized as described above. If now, with the ignition switch 20 being in closed position, the switch 71 is moved to its "on" position connecting the contacts 75 and 76. The electromagnet 30 will not be energized because it is shunted by the circuit comprising line 27, contact 25, movable contact member 23, contact 66, line 80 and terminal 46. However a current is permitted to flow through contact 75, contact member 72, contact 76 and line 77 to the low beam filaments 12 of the headlights 10 and from there to ground.

Thus, blinking signals may be given by operation of the switch 71 and by means only of the low beam filaments 12.

Whenever in this embodiment the main light switch 15 is moved to its third position marked II, current will flow from the positive terminal of the battery 24 through line 27, contact 25, member 23, contact 26 and line 28 to the parking light filaments 13 and to the tail lights 14, however at the same time current flows from member 23 through contact 29, line 58, terminal 49, contact 41, bridge member 16, contact 40, terminal 47, line 78, contact 74, member 72, contact 73, line 77 and through the low beam filaments 12 to ground. Consequently, with switch 71 being in normal or "off" position, the low beam filament 12, the parking light filaments 13 and the tail lights 14 are energized. In addition current flows through the winding 51 of the electromagnet 35 to ground so as to be ready for its holding action in the manner described above.

If now, with the ignition switch 20 being closed, the switch 71 is moved to its second or "on" position current flows from the positive terminal of the battery 24 through the switch 20, bypass line 59, terminal 50, electromagnet 30, terminal 46, contact 75, member 72, contact 76 and line 77 to the low beam filaments and to ground. As can be seen, the electromagnet 30 is energized hereby. Consequently, the bridging contact member 16 is moved from its first position shown in FIG. 6, to its second position in which it interconnects the contacts 42 and 43. Consequently the light from the low beam filaments 12 is extinguished and the high beam filaments 11 are energized. Whenever then the switch 71 is released and returned to its "off" position the electromagnet 30 is deenergized and the bridge member 16 is held in its second position by the already energized electromagnet 35 until upon another operation of the switch 71 the electromagnet 30 is again energized whereby the member 16 is forced to return, as described above, to its first position whereby again the high beam operation is switched to low beam operation.

It will be understood that each of the elements described above or two or more together, may also find a useful application in other types of light control arrangements for vehicles differing from the types described above.

While the invention has been illustrated and described as embodied in a light control and relay arrangement for vehicles having light means with a plurality of different filaments, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A light control arrangement for vehicles having light means with at least a high beam filament and a low beam filament, and a source of electric energy for energizing the same, comprising, in combination,
a high beam electrical connection between the source of energy and the high beam filament;
a low beam electrical connection between the source of energy and the low beam filament;
first operator-operable switch means arranged as main light switch in said low beam connection;
electromagnetic relay switch means comprising a plurality of contact means arranged in said low beam connection and in said high beam connection, respectively, and changeable between a first position in which said low beam connection is closed within said relay means while said high beam connection is interrupted, and a second position in which said low beam connection is interrupted and said high beam connection is closed within said relay means, biasing means permanently tending to establish said first position of said contact means, and electromagnetic holding means holding said contact means, when placed in said second position, in this second position against the action of said biasing means and being connected between the source of energy and said main light switch for being energized when the latter is in closed position, and electromagnet means for changing, when energized, said contact means from said first to said second position thereof; and
actuating means including second operator-operable switch means arranged as control switch for connecting, when desired, said electromagnet means with said source and for causing, upon a first energization of said electromagnet means, change of said contact means from said first to said second position against the action of said biasing means, and for causing, upon a following second energization thereof, change of said contact means from said second to said first position thereof against the action of said holding means.

2. A light control arrangement for vehicles having light means with a parking light filament, a high beam filament and a low beam filament, and a source of electric energy for energizing the same, comprising, in combination,
a parking light electrical connection between the source of energy and the parking light filament;
a high beam electrical connection between the source of energy and the high beam filament;
a low beam electrical connection between the source of energy and the low beam filament;
first operator-operable switch means arranged as main light switch in said low beam connection and in said parking light connection, and movable between circuit-opening position and a first circuit-closing position for said parking light connection and a second circuit-closing position for said low beam connection;
electromagnetic relay switch means comprising a plurality of contact means arranged in said low beam connection and in said high beam connection, respectively, and changeable between a first position in which said low beam connection is closed within said relay means while said high beam connection is interrupted, and a second position in which said low beam connection is interrupted and said high beam connection is closed within said relay means, biasing means permanently tending to establish said first position of said contact means, and electromagnetic holding means holding said contact means, when placed in said second position, in this second position against the action of said biasing means and being connected between the source of energy and said main light switch for being energized when the latter is in said second circuit-closing position, and electromagnet means for changing, when energized, said contact means from said first to said second position thereof; and
actuating means including second operator-operable switch means arranged as control switch for connecting, when desired, said electromagnet means with said source and for causing, upon a first energization of said electromagnet means, change of said contact means from said first to said second position against the action of said biasing means, and for causing, upon a following second energization thereof, change of said contact means from said second to said first position thereof against the action of said holding means.

3. An arrangement as claimed in claim 2, wherein said electromagnetic relay switch means include an auxiliary relay means having a coil connected between said second operator-operable switch means and said first operator-operable switch means for being energized when the latter switch means is in said first circuit-closing position and when additionally said second switch means is closed, said auxiliary relay means having a relay contact normally connecting said electromagnet means with said source and assuming upon energization of said coil a second position in which it connects said source with said low beam filament bypassing said contact means of said relay switch means.

4. An arrangement as claimed in claim 1, wherein said second operator-operable switch means is a selector switch which in its normal position connects said contact means of said relay switch means when in said first position thereof with said low beam filament, and which connects in its actuated position said low beam filament with a terminal of said main light switch which is connected with said source when said main light switch is in said first circuit-closing position thereof so that during actuation of said selector switch said electromagnet means is bypassed and said low beam filament is energized although said main light switch is in said first circuit-closing position thereof.

References Cited in the file of this patent

UNITED STATES PATENTS

| | | |
|---|---|---|
| 916,840 | Cabot | Mar. 30, 1909 |
| 2,716,206 | Salati | Aug. 23, 1955 |
| 2,888,611 | Matkins | May 26, 1959 |
| 2,908,781 | Brunicard | Oct. 13, 1959 |
| 2,910,621 | Paule | Oct. 27, 1959 |

FOREIGN PATENTS

| | | |
|---|---|---|
| 328,943 | Germany | Mar. 14, 1958 |